(12) United States Patent
Liu et al.

(10) Patent No.: US 9,631,850 B2
(45) Date of Patent: Apr. 25, 2017

(54) THERMAL EXPANSION VALVE WITH ONE-WAY CONTROL FUNCTION

(71) Applicant: Zhejiang Sanhua Co., Ltd., Xinchang County, Zhejiang Province (CN)

(72) Inventors: Changqing Liu, Zhejiang (CN); Ze Yuan, Zhejiang (CN); Boting Chen, Zhejiang (CN); Jie Liu, Zhejiang (CN)

(73) Assignee: Zhejiang Sanhua Co., Ltd., Zhejiang (CN)

( * ) Notice: Subject to any disclaimer, the term of this patent is extended or adjusted under 35 U.S.C. 154(b) by 189 days.

(21) Appl. No.: 14/396,684

(22) PCT Filed: Nov. 20, 2012

(86) PCT No.: PCT/CN2012/084881
§ 371 (c)(1),
(2) Date: Oct. 23, 2014

(87) PCT Pub. No.: WO2013/159509
PCT Pub. Date: Oct. 31, 2013

(65) Prior Publication Data
US 2015/0101685 A1    Apr. 16, 2015

(30) Foreign Application Priority Data

Apr. 28, 2012  (CN) .......................... 2012 1 0132448
Jul. 12, 2012   (CN) .......................... 2012 1 0240681
(Continued)

(51) Int. Cl.
*F25B 41/06*    (2006.01)
*F16K 31/00*    (2006.01)
(Continued)

(52) U.S. Cl.
CPC .......... *F25B 41/062* (2013.01); *F16K 11/105* (2013.01); *F16K 31/002* (2013.01);
(Continued)

(58) Field of Classification Search
CPC ... F16K 11/105; F25B 41/062; G05D 23/023; Y10T 137/7737
(Continued)

(56) References Cited

U.S. PATENT DOCUMENTS 4,214,698 A    7/1980  Josefsson
5,002,089 A    3/1991  Reedy et al.
(Continued)

FOREIGN PATENT DOCUMENTS

CN    1269479 A    10/2000
CN    1499160 A    5/2004
(Continued)

OTHER PUBLICATIONS

Chinese Office Action, dated Dec. 31, 2015, from a corresponding Chinese Application No. 201210132448.X.
(Continued)

*Primary Examiner* — Kevin Lee
*Assistant Examiner* — P. Macade Nichols
(74) *Attorney, Agent, or Firm* — Wolf, Greenfield & Sacks, P.C.

(57) ABSTRACT

A thermal expansion valve with one-way control function includes a valve body having an inlet passage and an out passage, a temperature sensor installed on one end of the valve body, and a first valve core component installed in an inside chamber of the valve body. The first valve core component includes a first valve core and a valve rod against the temperature sensor. The valve body also includes an accommodation component extending from said the inlet passage into the valve body and coaxially installed with the
(Continued)

inlet passage. The accommodation component has a second valve port connected with the inside chamber. The accommodation component has a second valve core component having a supporting piece and a second valve core matching the second valve port. The processing of the structure is convenient and the assembly of the second valve core component is simple and reliable.

31 Claims, 15 Drawing Sheets

(30) Foreign Application Priority Data

Oct. 31, 2012 (CN) .......................... 2012 1 0429299
Oct. 31, 2012 (CN) .......................... 2012 1 0429764

(51) Int. Cl.
*F16K 11/10* (2006.01)
*G05D 23/02* (2006.01)

(52) U.S. Cl.
CPC ...... *G05D 23/025* (2013.01); *Y10T 137/7736* (2015.04); *Y10T 137/7737* (2015.04)

(58) Field of Classification Search
USPC .................................. 137/468, 471; 236/92 B
See application file for complete search history.

(56) References Cited

U.S. PATENT DOCUMENTS

| | | | |
|---|---|---|---|
| 5,251,459 A | 10/1993 | Grass et al. | |
| 5,975,130 A | 11/1999 | Ligh et al. | |
| 6,418,741 B1 | 7/2002 | Nungesser et al. | |
| 6,520,481 B2 * | 2/2003 | Harneit | F16K 5/103 137/599.17 |
| 6,530,528 B2 | 3/2003 | Breyer et al. | |
| 2007/0194140 A1 | 8/2007 | Nestler et al. | |

FOREIGN PATENT DOCUMENTS

| | | |
|---|---|---|
| CN | 2931997 Y | 8/2007 |
| CN | 201043624 Y | 4/2008 |
| CN | 201053524 Y | 4/2008 |
| CN | 101415979 A | 4/2009 |
| CN | 201251327 Y | 6/2009 |
| CN | 201387188 Y | 1/2010 |
| CN | 201391676 Y | 1/2010 |
| CN | 202229490 U | 5/2012 |
| EP | 1357339 A2 | 10/2003 |
| JP | 2003185299 A | 7/2003 |
| JP | 2005315376 A | 11/2005 |
| WO | WO 2008074383 A1 | 6/2008 |

OTHER PUBLICATIONS

Chinese Office Action, dated Dec. 30, 2015, from a corresponding Chinese Application No. 201210429299.3.
Chinese Office Action, dated Dec. 21, 2015, from a corresponding Chinese Application No. 201210429764.3.
International Search Report dated Feb. 28, 2013 from corresponding International Application No. PCT/CN2012/084881.

* cited by examiner

THERMAL EXPANSION VALVE WITH ONE-WAY CONTROL FUNCTION

This application is the national phase of International Application No. PCT/CN2012/084881, titled "THERMAL EXPANSION VALVE WITH ONE-WAY CONTROL FUNCTION", filed on Nov. 20, 2012, which claims the benefit of priorities to Chinese patent application No. 201210132448.X titled "THERMAL EXPANSION VALVE WITH ONE-WAY CONTROL FUNCTION" and filed with the Chinese State Intellectual Property Office on Apr. 28, 2012; Chinese patent application No. 201210240681.X titled "THERMAL EXPANSION VALVE WITH ONE-WAY CONTROL FUNCTION" and filed with the Chinese State Intellectual Property Office on Jul. 12, 2012; Chinese patent application No. 201210429764.3 titled "THERMAL EXPANSION VALVE WITH ONE-WAY CONTROL FUNCTION" and filed with the Chinese State Intellectual Property Office on Oct. 31, 2012; and Chinese patent application No. 201210429299.3 titled "THERMAL EXPANSION VALVE WITH ONE-WAY CONTROL FUNCTION" and filed with the Chinese State Intellectual Property Office on Oct. 31, 2012, which are incorporated herein by reference in their entireties.

TECHNICAL FIELD

The present application relates to the technical field of refrigeration components, and in particular to a thermal expansion valve with one-way control function.

BACKGROUND

A thermal expansion valve as a throttling device is widely used in a loop of a refrigeration system, and is used to control the flow of refrigerant by sensing the temperature and the pressure of the refrigerant at a specific position. With the continuous popularization of a commercial refrigerating device, the thermal expansion valve is also widely used in a commercial refrigeration system with a large capacity.

In the conventional technology, in a case that a pipeline extending from an evaporator and a condenser to a compressor is relative long (longer than 25 meters) in a refrigerating system, a check valve is required to be arranged in parallel to the thermal expansion valve (the direction of the check valve is opposite to that of the expansion valve), so as to improve the operational stability of the system. The flow direction in the check valve is opposite to the flow direction in a valve port of the expansion valve, and when refrigerant in the system flows in a forward direction (flowing from an inlet to an outlet), the check valve is closed by pressure difference and the thermal expansion valve functions; and when the refrigerant in the system flows in a reverse direction, the check valve is opened by pressure difference and the thermal expansion valve dose not work. However, the check valve and bypass passages which are separately arranged may increase the costs for assembly and maintenance, and increase the risk of potential leakage.

In view of this, recently, in order to simplify the components of the refrigerating system, a method of replacing the expansion valve and the check valve, which are separately arranged, with a thermal expansion valve with one-way control function is widely used in the refrigerating system. Chinese patent application No. CN200310103606 discloses a thermal expansion valve, and as shown in FIG. 1, the thermal expansion valve includes a valve body 54' on which an inlet passage and an outlet passage are provided. An inner cavity 40' is provided in the valve body 54' and is in communication with the inlet passage and the outlet passage. A valve port 42' is provided in the inner cavity 40'. A temperature sensing component 30' is arranged at one end of the valve body 54' to close the inner cavity 40'. A valve core component is placed in the inner cavity 40', and has a valve rod 32' abutting against the temperature sensing component 30', and a valve core 33' cooperating with the valve port 42' to control the flow of fluid medium flowing from the inlet passage to the outlet passage. A nut cover 64' is further mounted in the valve body 54', and is provided with an accommodating hole 48' in communication with the inner cavity 40'. A valve core 70' is arranged in the accommodation hole 48', and an auxiliary valve port 50' is machined on the valve body 54'. When the medium flows from the inlet passage to the outlet passage, the auxiliary valve port 50' is closed; and when the medium flows from the outlet passage to the inlet passage, the auxiliary valve port 50' is opened.

Apparently, the above structure may integrate the expansion valve and the check valve which are separately provided as an integrated structure, however an opening is required to be additionally machined on the valve body for arranging the nut cover and the check valve, which is prone to cause leakage of the expansion valve and directly reduces the reliability of the product. Furthermore, this structure is complicated and has a high requirement for processing technology.

In view of this, it is urgent to optimize the structure of the conventional thermal expansion valve having the check valve to improve the manufacturability and the operational reliability.

SUMMARY

In view of the above defects, a technical problem to be solved by the present application is to provide a thermal expansion valve with one-way control function, which may effectively reduce the impact on the flow capacity of a check valve on a basis of improving the manufacturability.

A thermal expansion valve with one-way control function is provided according to the present application, which includes a valve body having an inlet passage and an outlet passage, a temperature sensing component placed at one end of the valve body, and a first valve core component placed in an inner cavity of the valve body, wherein the first valve core component includes a valve rod abutting against the temperature sensing component, and a first valve core configured to cooperate with a first valve port in the inner cavity to control a flow of fluid medium flowing from the inlet passage to the outlet passage, and the valve body further includes an accommodating portion extending inwardly to the valve body from the inlet passage, the accommodating portion is provided with a second valve port in communication with the inner cavity, a second valve core component is provided in the accommodating portion; and in a case that the medium flows from the inlet passage to the outlet passage, the second valve port is closed; and in a case that the medium flows from the outlet passage to the inlet passage, the second valve port is opened.

Preferably, the inlet passage coaxially extends into the valve body to form the accommodating portion, and the valve rod extends between the accommodating portion and the inlet passage.

Preferably, the accommodating portion is a hole extending inwardly to the valve body from the inlet passage and having the same diameter as the inlet passage, and the second valve port is provided at a bottom of the hole.

Preferably, the second valve core component includes a supporting member, and a second valve core for cooperating with the second valve port.

Preferably, the accommodating portion and the inlet passage are arranged to form a stepped hole, and the second valve port is provided at a bottom of the stepped hole.

Preferably, the supporting member abuts against a stepped surface of the stepped hole.

Preferably, the supporting member is fixed by a snap ring.

Preferably, the supporting member is provided with an elastic retaining portion, and the supporting member is retained in the accommodating portion via the elastic retaining portion.

Preferably, the second valve core is spherical and abuts against the supporting member via a spring.

Preferably, the second valve core includes a first segment and a second segment, the first segment has an approximately tapered structure, and the second segment has a cylindrical structure for cooperating with the supporting member.

Preferably, a communicating hole in communication with the second valve port is provided in the inner cavity at a side adjacent to the outlet passage, and the communicating hole forms an angle with respect to an axis of the outlet passage.

Preferably, the accommodating portion is in communication with the outlet passage via a second communicating passage, the outlet passage and the first communicating passage are arranged in parallel and are in communication with each other, and the outlet passage and the second communicating passage are arranged in parallel and are in communication with each other.

Preferably, the thermal expansion valve further includes a connecting pipe welded on the valve body and allowing fluid to flow out, and the connecting pipe is in communication with the outlet passage.

Preferably, a highest surface of an inner hole of the connecting hole is not lower than a lowest surface of an inner hole of the second communicating passage.

Preferably, the thermal expansion valve further includes a connecting pipe welded on the valve body and allowing fluid to flow out, and the connecting pipe extends to a bottom end of the outlet passage.

Preferably, a cross section of the first communicating passage has an approximately elliptical structure.

Preferably, a limiting pin rod for limiting an opening operational position of the second valve core component is further provided in the accommodating portion.

Preferably, the valve body is provided with a guiding hole in communication with the accommodating portion, and the limiting pin rod is fixedly inserted in the guiding hole.

Preferably, a positioning blind hole is provided at another side wall of the accommodating portion that is axially facing the guiding hole, and an inner end of the limiting pin rod is placed in the positioning blind hole.

Preferably, in a projective plane perpendicular to a direction of movement of the second valve core component, a ratio of an area of a portion of the limiting pin rod located in the accommodating portion to an area of the accommodating portion is less than 0.2.

Preferably, an elastic component is provided on the limiting pin rod at a position where the limiting pin rod cooperates with the second valve core component.

Preferably, the limiting pin rod is arranged in a direction perpendicular to the direction of movement of the second valve core component.

Preferably, the limiting pin rod is arranged in a direction perpendicular to the direction of movement of the second valve core component.

Preferably, a limiting sleeve is arranged between the valve rod and the valve body, and the limiting sleeve extends inwardly into the accommodating portion to limit an opening operational position of the second valve core component.

Preferably, a positioning stopping port is provided in the valve body above the first valve port, and is configured to accommodate an inner end of the limiting sleeve, which is protruding out, and the limiting sleeve is provided with a through hole configured to communicate the inlet passage with the accommodating portion.

Preferably, the valve body is provided with an insertion-type mounting hole at a position corresponding to the first valve port, and the insertion-type mounting hole is configured to accommodate an inner end of the limiting sleeve, which is protruding out, and the first valve port is formed at the inner protruding end of the limiting sleeve, and the limiting sleeve is provided with a through hole configured to communicate the inlet passage with the accommodating portion.

Preferably, the limiting sleeve has a positioning surface abutting against the valve body at one side of the insertion-type mounting hole, and a first sealing member is arranged between the positioning surface and the valve body.

Preferably, a center axis of the through hole is located below a center axis of the inlet passage.

Preferably, a second sealing member is arranged between a portion of the valve rod that protrudes out of the limiting sleeve and the valve body.

Preferably, a third sealing member is arranged between the limiting sleeve and the valve rod, and a fourth sealing member is arranged between the limiting sleeve and the valve body.

Preferably, an elastic component is provided on the limiting sleeve at a position where the limiting sleeve cooperates with the second valve core component.

Compared with the conventional technology, in the thermal expansion valve with one-way control function according to the present application, the accommodating portion of the second valve core component is an extending portion of the inlet passage in the valve body, thus it is not necessary to additionally machine a hole, which reduces the risk of leakage. Furthermore, this structure is convenient to manufacture and the assembly of the second valve core component is simple and reliable.

In a preferred embodiment according to the present application, the first communicating passage and the second communicating passage are both arranged in parallel to the outlet passage and are both in communication with the outlet passage, thereby reducing the resistance on the fluid and improving the environment of the flow passage system.

In another preferred embodiment according to the present application, a limiting pin rod is provided to limit the opening operational position of the second valve core component, which may greatly reduce the blocking effect on the flow passage caused by the limiting and provide a reliable guarantee for improving the performance of the valve.

In yet another preferred embodiment according to the present application, a limiting sleeve is provided between the valve rod and the valve body to limit the opening operational position of the second valve core component, in other words, the limiting sleeve is coaxially arranged with the valve rod. Thus, it is not necessary to manufacture a separate mounting structure for the liming sleeve, and the valve rod may be positioned by the limiting sleeve, thereby reducing a length of a positioning hole at a corresponding position in the valve body in the original structure, that is, the thickness of the valve body material is reduced. Further, the outlet end of the valve body (during operation of the expansion valve) is shorter, and a distance of the gravity of the valve deviating from the axis is smaller, therefore the valve component may be self-balanced in the welding process without requiring a specific welding fixture. Thus, the manufacturability of the product may be further improved on the basis of effectively limiting the opening operational position of the second valve component.

REFERENCE NUMERALS IN FIGS. 2 TO 24

| 1 valve body, | 11 inlet passage, |
|---|---|
| 12 outlet passage, | 13 inner cavity, |
| 14 first valve port, | 15 second valve port, |
| 16 accommodating portion, | 17 hole, |
| 18 stepped surface, | 19 communicating hole, |
| 191 guiding hole, | 192 positioning blind hole, |
| 1931 positioning stopping port, | 1932 insertion-type mounting hole, |
| 2 temperature sensing component, | 31 first communicating passage, |
| 32 second communicating passage, | 33 bottom surface, |
| 4 first valve core component, | 41 valve rod, |
| 42 first valve core, | 5/5A second valve core component, |
| 51 supporting member, | 511 elastic retaining portion, |
| 512 base portion, | 513 hole, |
| 52 second valve core, | 521 first segment, |
| 522 second segment, | 53 elastic component, |
| 54 snap ring, | 55 limiting pin rod, |
| 56 limiting sleeve, | 561 through hole, |
| 562 positioning surface, | 6 connecting pipe, |
| 7 connecting pipe, | 8 valve seat assembly, |
| 81 valve supporting seat, | 82 spring, |
| 83 base, | 9 nut cover, |
| 91 second sealing member, | 92 first sealing member, |
| 93 third sealing member, and | 94 fourth sealing member. |

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

First Embodiment

Figure 1:
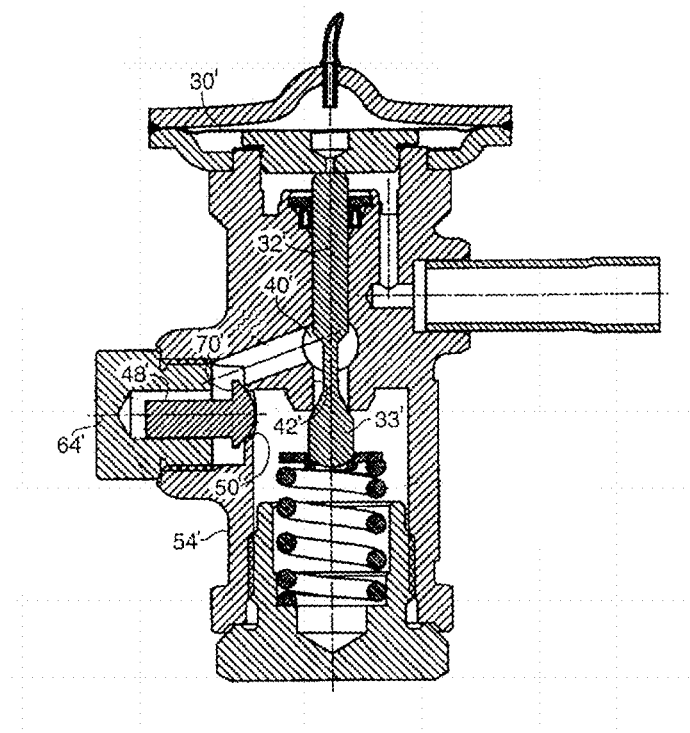
FIG. 1 is a schematic view showing the structure of a typical thermal expansion valve with one-way control function in the conventional technology.
Figure 2:
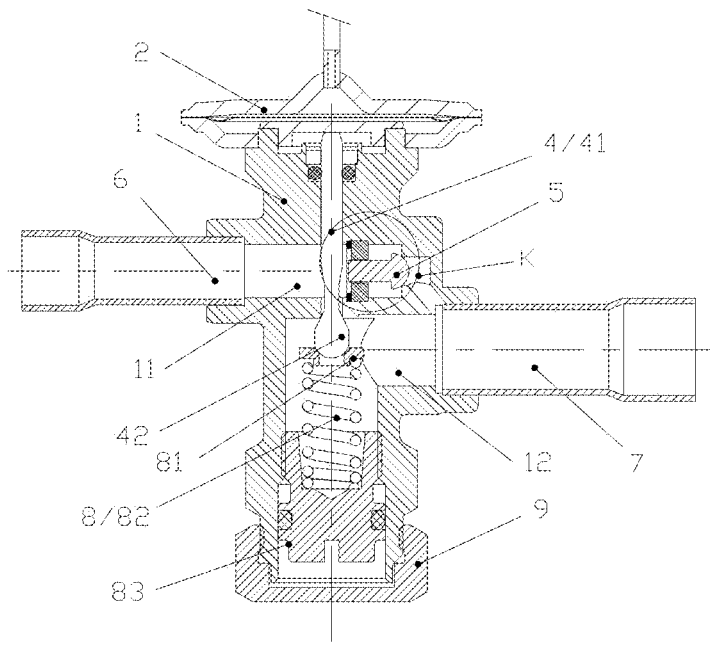
FIG. 2 is a schematic view showing the structure of a thermal expansion valve with one-way control function according to an example in the embodiments.
Figure 3:
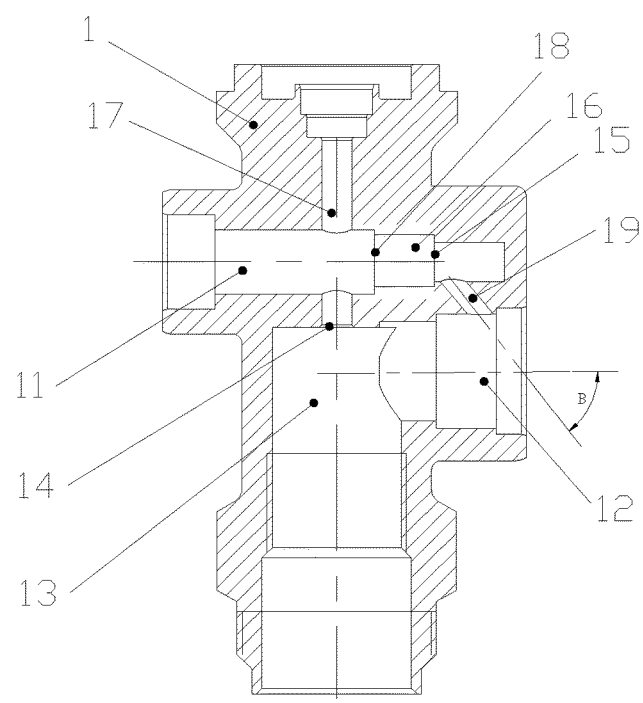
FIG. 3 is a schematic view showing the structure of a valve body of the thermal expansion valve in FIG. 2.

Reference is made to FIGS. 2 and 3. FIG. 2 is a schematic view showing the structure of a thermal expansion valve with one-way control function according to this embodiment, and FIG. 3 is a schematic view showing the structure of a valve body of the thermal expansion valve in FIG. 2.

As shown in FIGS. 2 and 3, the thermal expansion valve includes a valve body 1, and an inlet passage 11 and an outlet passage 12 are provided on the valve body 1. An inner cavity 13 in communication with the inner passage 11 and the outlet passage 12 is machined in the valve body 1. A temperature sensing component 12 is arranged at an end of the valve body 1 and closes the inner cavity 13. The inner cavity 13 of the valve body 1 further includes a vertical through hole 17 in communication with the temperature sensing component 2. The through hole 17 intersects with the inner cavity below the through hole 17 to form a first valve port 14.

A first valve core component 4 is provided in and extends through the through hole 17 in the inner cavity 13. The first valve core component 4 includes a valve rod 41 and a first valve core 42. The valve rod 41 abuts against the temperature sensing component 2. In this embodiment, the valve rod 41 is integrally formed with the first valve core 42. Of course, the valve rod 41 and the first valve core 42 may also be separately produced and then combined together.

A valve seat assembly 8 is further arranged in the inner cavity 13 of the valve body 1, which includes a base 83 fixed on the valve body 1, and a valve supporting seat 81 abutting against the first valve core 42 via a spring 82. A connecting pipe 6 and a connecting pipe 7 are hermetically welded on the valve body 1 and are respectively connected to the inlet passage 11 and the outlet passage 12.

The first valve core 42 of the first valve core component 4 cooperates with the first valve port 14 to control the flow of fluid medium flowing from the inlet passage 11 to the outlet passage 12. In other words, when the pressure inside the temperature sensing component 2 increases, a transmission plate of the temperature sensing component 2 pushes the first valve core component 4 to move downwardly against the force of the spring 82, thus an opening between the first valve core 42 and the first valve port 14 is increased, which increases the flow of the fluid; on the contrary, when the pressure in the temperature sensing component 2 decreases, the first valve core component 4 is moved upwardly under a retuning force of the spring 82, thus the opening between the first valve core 42 and the first valve port 14 is decreased, which reduces the flow of the fluid.

An accommodating portion 16 extending inwards in a direction coaxial with an axis of the inlet passage 11 is formed in the valve body 1. In this embodiment, the accommodating portion 16 and the inlet passage 11 are arranged as a concentric stepped hole. A second valve port 15 is formed at a bottom of the stepped hole. A communicating hole 19 in communication with the second valve port 15 is provided in the inner cavity 13 at a side of the outlet passage 12. An axis of the communicating hole 19 and an axis of the outlet passage 12 form an angle (B). Here, the angle (B) is provided to ensure that the communicating hole 19 may be conveniently machined at the side of the outlet passage 12 with a tool by avoiding a pipe wall of the outlet passage 12. A second valve core component 5 is further provided in the accommodating portion 16, and the valve rod 41 extends between the accommodating portion 16 and the inlet passage 11. Of course, in the present application, the accommodating portion 16 may also be a hole of an extension segment of the inlet passage 11 which has the same radius as the inlet passage 11; in other words, the accommodating portion and the inlet passage are actually two parts of one hole, and the second valve port 15 is provided at the bottom of this hole.

Figures 4, 5:
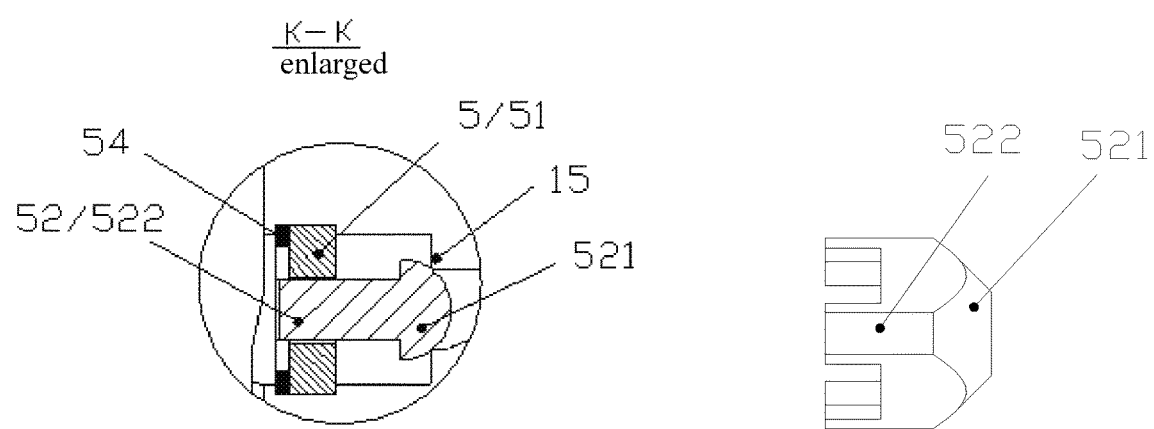
FIG. 4 is a partially enlarged schematic view of a mounting position of a second valve core component of the thermal expansion valve shown in FIG. 2.
FIG. 5 is a schematic view showing the structure of another preferable valve core in the second valve core component shown in FIG. 2.

Reference is further made to FIG. 4, which is a partially enlarged schematic view of a mounting position of the second valve core component in this embodiment.

As shown in FIG. 4, the second valve core component 5 includes a supporting member 51 and a second valve core 52. The supporting member 51 abuts against a stepped surface 18 formed between the accommodating portion 16 and the inlet passage 11 and is fixed by a snap ring 54. The second valve core 52 includes a first segment 521 and a second segment 522. The second segment 522 has a cylindrical structure for cooperating with the supporting member, and the first segment 52 has a conical structure for cooperating with the second valve port 15.

Due to the second valve core structure, when the medium flows from the inlet passage 11 to the outlet passage 12, the second valve core 52 abuts against the second valve port 15 under the pressure of the fluid and closes the valve port; and when the medium flows from the outlet passage 12 to the inlet passage 11, the second valve core 52 moves away from the second valve port 15 under the pressure of the fluid and opens the valve port.

Due to the above design solution, under the premise of providing a one-way control function, the thermal expansion valve has a compact structure and is convenient to produce; and the assembly of the second valve core component is simple and reliable, without additionally machining a hole, thereby reducing the risk of leakage.

Figure 6:
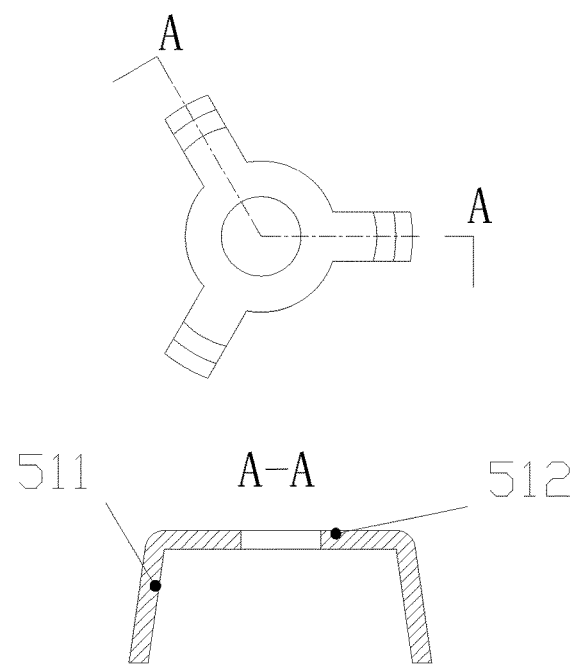
FIG. 6 is a schematic view showing the structure of another preferable supporting member in the second valve core component shown in FIG. 2.

FIG. 5 is a schematic view showing the structure of another preferable valve core in the second valve core component shown in FIG. 2, and FIG. 6 is schematic view showing the structure of another preferable supporting member in the second valve core component shown in FIG. 2.

As shown in FIGS. 5 and 6, the second valve core according to this solution includes a first segment 521 and a second segment 522. The second segment 522 cooperates with the supporting member. The second segment 522 has a cylindrical structure at the middle which is used to be slidably arranged in a hole of the supporting member, and has a rib-shaped structure at an outer portion which may be positioned and guided by the wall of the hole of the accommodating portion 16. The first segment 521 has a conical structure for cooperating with the second valve port 15. The supporting member according to this solution includes a base portion 512 and an elastic retaining portion 511. The supporting member 51 may be directly retained in the accommodating portion 16 via the elastic retaining portion 511.

Second Embodiment

Figure 7:
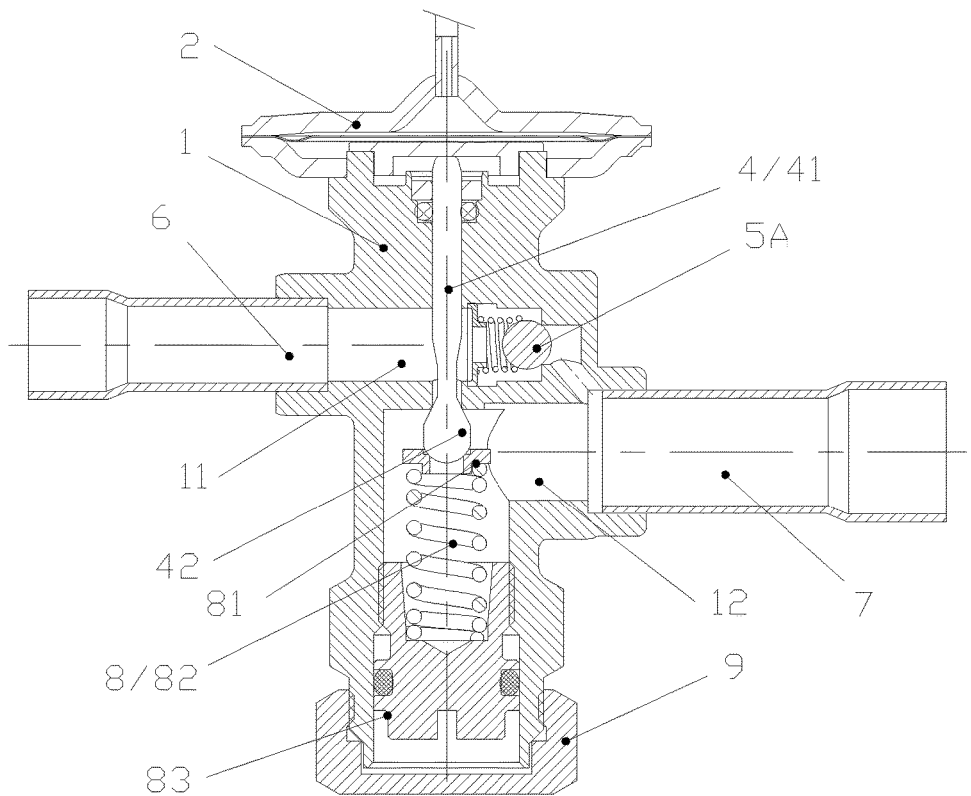
FIG. 7 is a schematic view showing the structure of a thermal expansion valve with one-way control function according to a second example of the embodiments.

FIG. 7 is schematic view showing the structure of a thermal expansion valve with one-way control function according to a second embodiment of the present application. In this embodiment, the valve core 52 is spherical, and may be a steel ball or a ceramic ball, and abuts against the supporting member 51 via a spring 53.

Third Embodiment

Figure 8:
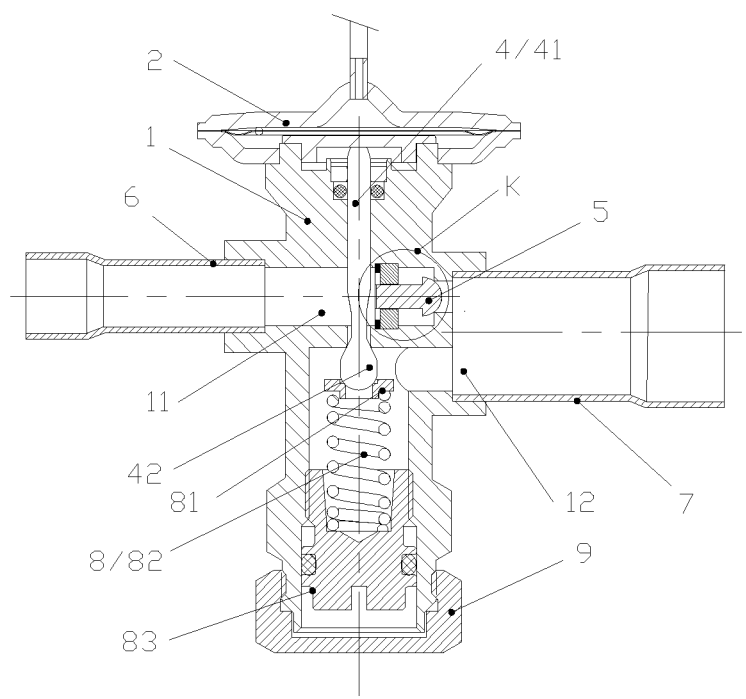
FIG. 8 is a schematic view showing the structure of a thermal expansion valve with one-way control function according to a third example of the embodiments.
Figure 9:
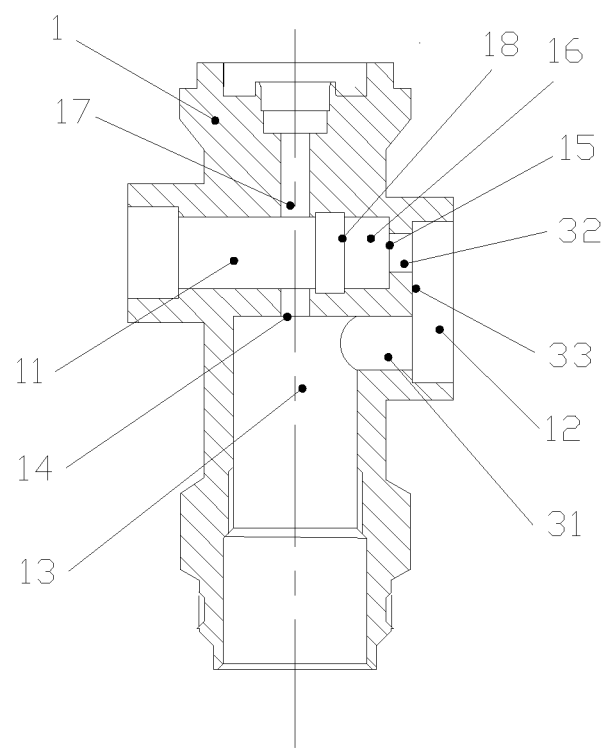
FIG. 9 is a schematic view showing the structure of a valve body of the thermal expansion valve shown in FIG. 8.

Reference is made to FIGS. 8 and 9. FIG. 8 is a schematic view showing the structure of a thermal expansion valve with one-way control function according to a third embodiment, and FIG. 9 is a schematic view showing the structure of a valve body of the thermal expansion valve shown in FIG. 8.

As shown in FIGS. 8 and 9, in this embodiment, the thermal expansion valve includes a valve body 1, and an inlet passage 11 and an outlet passage 12 are provided on the valve body 1. An inner cavity 13 in communication with the inner passage 11 and the outlet passage 12 is machined in the valve body 1. A temperature sensing component 12 is arranged at an end of the valve body 1. The inner cavity 13 of the valve body 1 further includes a vertical through hole 17 in communication with the temperature sensing component 2. A lower portion of the hole 17 intersects with the inner cavity 13 to form a first valve port 14.

A first valve core component 4 is provided in and extends through the through hole 17 in the inner cavity 13. The first valve core component 4 includes a valve rod 41 and a first valve core 42. The valve rod 41 abuts against the temperature sensing component 2. In this embodiment, the valve rod 41 is integrally formed with the first valve core 42. Of course, the valve rod 41 and the first valve core 42 may also be separately produced and then combined together.

A valve seat assembly 8 is further arranged in the inner cavity 13 of the valve body 1, which includes a base 83 fixed on the valve body 1, and a valve supporting seat 81 abutting against the first valve core 42 via a spring 82. In this embodiment, a connecting pipe 6 allowing the fluid to flow in and a connecting pipe 7 allowing the fluid to flow out are hermetically welded on the valve body 1. The connecting pipe 6 is in communication with the inlet passage 11. The connecting pipe 7 directly protrudes into the outlet passage 12 and directly abuts against a bottom surface 33 of the outlet passage 12. The inner cavity 13 and the outlet passage 12 of the valve body 1 are communicated via a first communicating passage 31. The outlet passage 12 and the first communicating passage 31 are arranged in parallel and are in communication with each other, thus the resistance on the fluid flowing from the first communicating passage 31 into the outlet passage 12 may be reduced. In order to reduce the radius of the connecting pipe 7, preferably, a cross section of the first communicating passage 31 may be designed as a substantially elliptical structure, to reduce an axial width of the first communicating passage 31. For example, the cross section of the first communicating passage 31 may be designed as an elliptical structure or a substantially racetrack-shaped structure.

The first valve core 42 of the first valve core component 4 cooperates with the first valve port 14 to control the flow of fluid medium flowing from the inlet passage 11 to the outlet passage 12. In other words, when the pressure inside the temperature sensing component 2 increases, a transmission plate of the temperature sensing component 2 pushes the first valve core component 4 to move downwardly against the force of the spring 82, thus an opening between the first valve core 42 and the first valve port 14 is increased, which increases the flow of the fluid; on the contrary, when the pressure in the temperature sensing component 2 decreases, the first valve core component 4 is moved upwardly under a retuning force of the spring 82, thus the opening between the first valve core 42 and the first valve port 14 is decreased, which reduces the flow of the fluid.

An accommodating portion 16 extending inwards in a direction coaxial with an axis of the inlet passage 11 is formed in the valve body 1. In this embodiment, the accommodating portion 16 and the inlet passage 11 are arranged as a concentric stepped hole. A second valve port 15 is formed at a bottom of the stepped hole. The accommodating portion 16 is in communication with the outlet passage 12 via a second communicating passage 32. The outlet passage 12 and the second communicating passage 32 are arranged in parallel and are in communication with each other, thus the resistance on the fluid flowing from the outlet passage 12 into the second communicating passage 32 may be reduced.

A second valve core component 5 is further provided in the accommodating portion 16, and the valve rod 41 extends between the accommodating portion 16 and the inlet passage 11. Of course, in the present application, the accommodating portion 16 may also be a hole of an extension segment of the inlet passage 11 which has the same radius as the inlet passage 11; in other words, the accommodating portion and the inlet passage are actually two parts of one hole, and the second valve port 15 is provided at the bottom of this hole.

It is to be noted that, the specific structure and the connection relationship of the second valve core component in this embodiment are the same as that of the first embodiment and the second embodiment, which will not be described herein.

Fourth Embodiment

Figure 10:
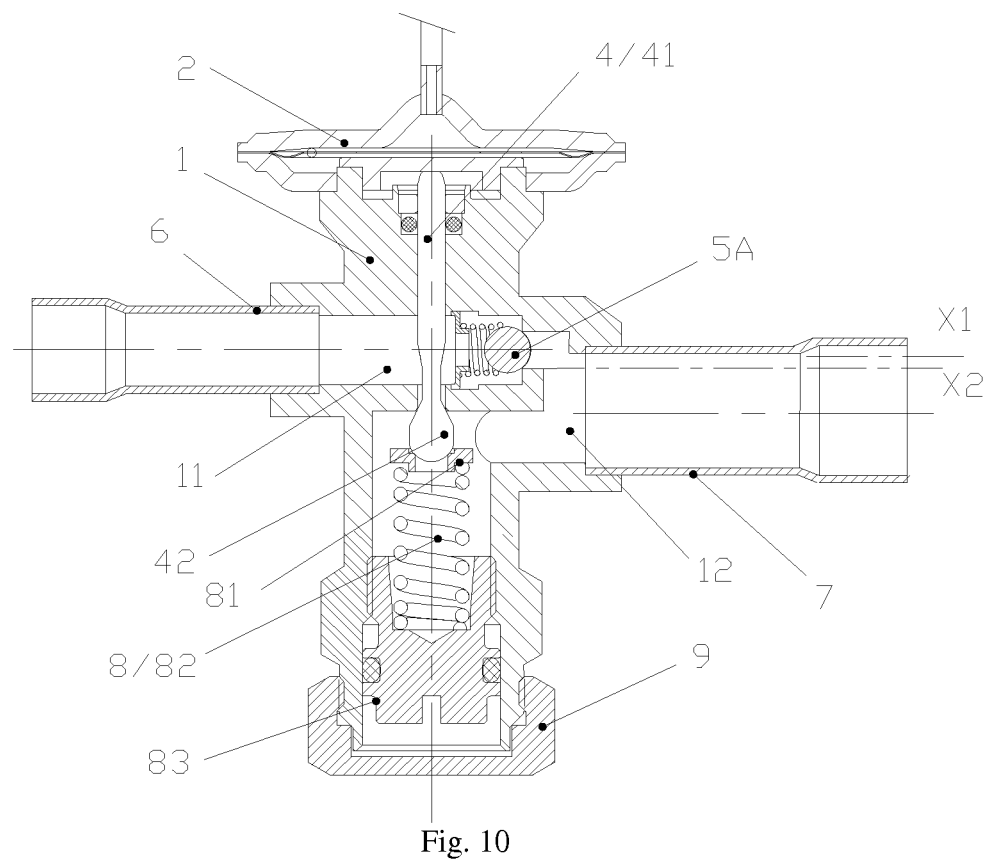
FIG. 10 is a schematic view showing the structure of a thermal expansion valve with one-way control function according to a fourth example of the embodiments.
Figure 11:
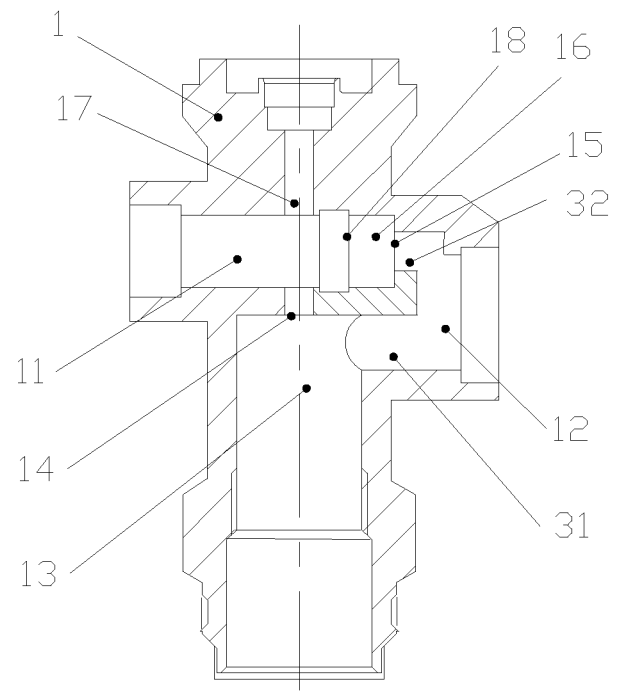
FIG. 11 is a schematic view showing the structure of a valve body of the thermal expansion valve in FIG. 10.

Reference is made to FIGS. 10 and 11. FIG. 10 is a schematic view showing the structure of a thermal expansion valve with one-way control function according to a fourth embodiment, and FIG. 11 is a schematic view showing the structure of a valve body of the thermal expansion valve in FIG. 10.

Unlike the above solutions, in this embodiment, as shown in FIGS. 10 and 11, a connecting pipe 6 allowing the fluid to flow in and a connecting pipe 7 allowing the fluid to flow out are hermetically welded on the valve body 1. The connecting pipe 6 is in communication with the inlet passage 11, and the connecting pipe 7 is in communication with the outlet passage 12. Compared to the above solutions, in this embodiment, a hole diameter of the connecting pipe 7 may be smaller than a hole diameter of the outlet passage 12. In this solution, preferably, a highest surface of an inner hole of the connecting pipe 7 may be designed to be higher than a lowest surface X2 of an inner hole of the second communicating passage 32, which may further reduce the resistance on the fluid flowing therethrough.

Similar to the third embodiment, the second valve core 52 in this solution is spherical, and may be a steel ball or a ceramic ball, and abuts against the supporting member 51 via a spring 53.

Fifth Embodiment

Figure 12:
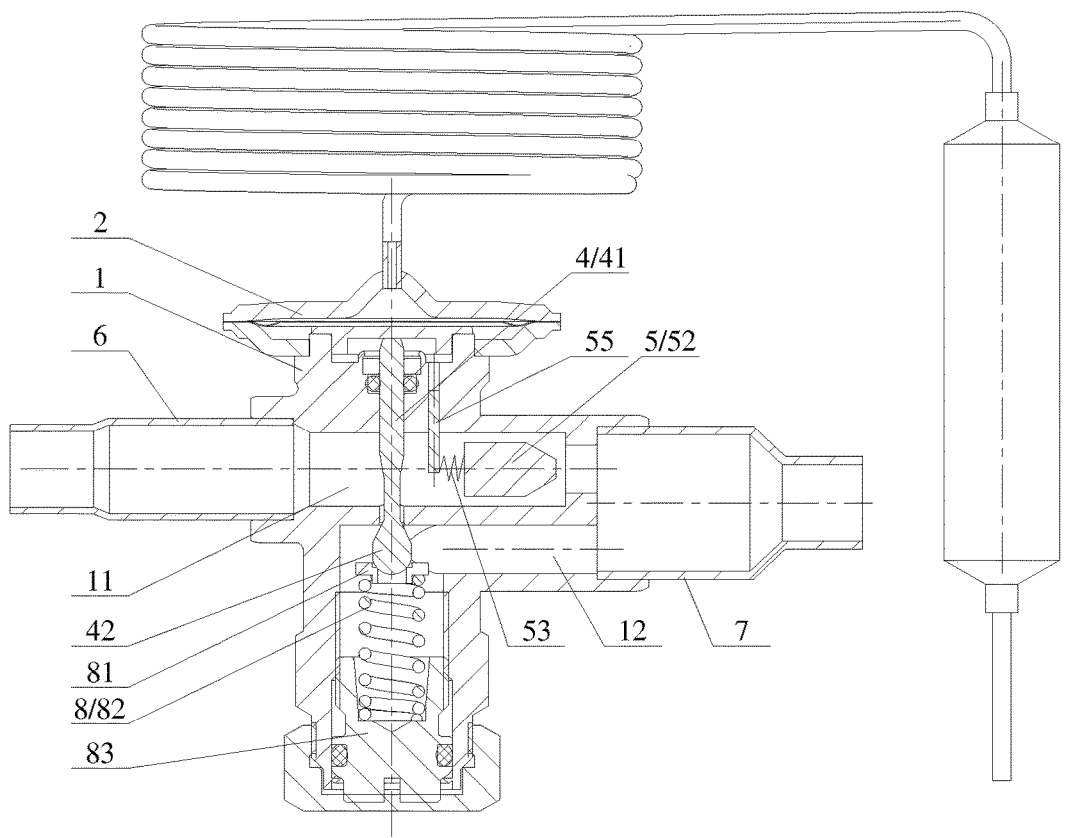
FIG. 12 is a schematic view showing the structure of a thermal expansion valve with one-way control function according to a fifth example of the embodiments.
Figure 13:
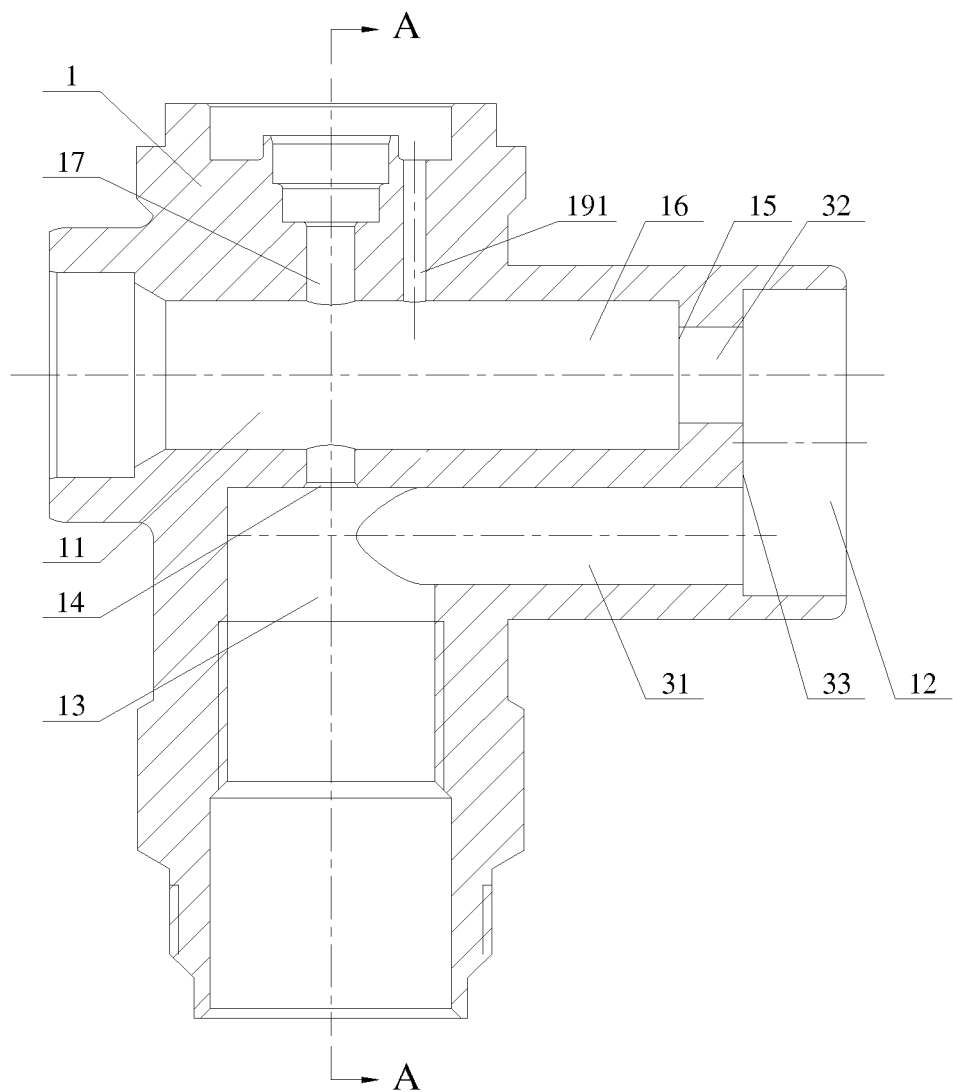
FIG. 13 is a schematic view showing the structure of a valve body of the thermal expansion valve shown in FIG. 12.

Reference is made to FIGS. 12 and 13. FIG. 12 is a schematic view showing the structure of a thermal expansion valve with one-way control function according to a fifth embodiment; and FIG. 13 is schematic view showing the structure of a valve body of the thermal expansion valve shown in FIG. 12.

As shown in FIGS. 12 and 13, in this embodiment, the thermal expansion valve includes a valve body 1, and an inlet passage 11 and an outlet passage 12 are provided on the valve body 1. An inner cavity 13 in communication with the inner passage 11 and the outlet passage 12 is machined in the valve body 1. A temperature sensing component 12 is arranged at an end of the valve body 1. The inner cavity 13 of the valve body 1 further includes a vertical through hole 17 in communication with the temperature sensing component 2. A lower portion of the hole 17 intersects with the inner cavity 13 to form a first valve port 14.

A first valve core component 4 is provided in and extends through the through hole 17 in the inner cavity 13. The first valve core component 4 includes a valve rod 41 and a first valve core 42. The valve rod 41 abuts against the temperature sensing component 2. As shown in the Figures, in this embodiment, the valve rod 41 is integrally formed with the first valve core 42. Of course, the valve rod 41 and the first valve core 42 may also be separately produced and then combined together.

A valve seat assembly 8 is further arranged in the inner cavity 13 of the valve body 1, which includes a base 83 fixed on the valve body 1, and a valve supporting seat 81 abutting against the first valve core 42 via a spring 82. In this embodiment, a connecting pipe 6 allowing the fluid to flow in and a connecting pipe 7 allowing the fluid to flow out are hermetically welded on the valve body 1. The connecting pipe 6 is in communication with the inlet passage 11. The connecting pipe 7 directly protrudes into the outlet passage 12 and directly abuts against a bottom surface 33 of the outlet passage 12. The inner cavity 13 and the outlet passage 12 of the valve body 1 are communicated via a first communicating passage 31. Preferably, the outlet passage 12 and the first communicating passage 31 are arranged in parallel and are in communication with each other, thus the resistance on the fluid flowing from the first communicating passage 31 into the outlet passage 12 may be reduced.

Figure 14:
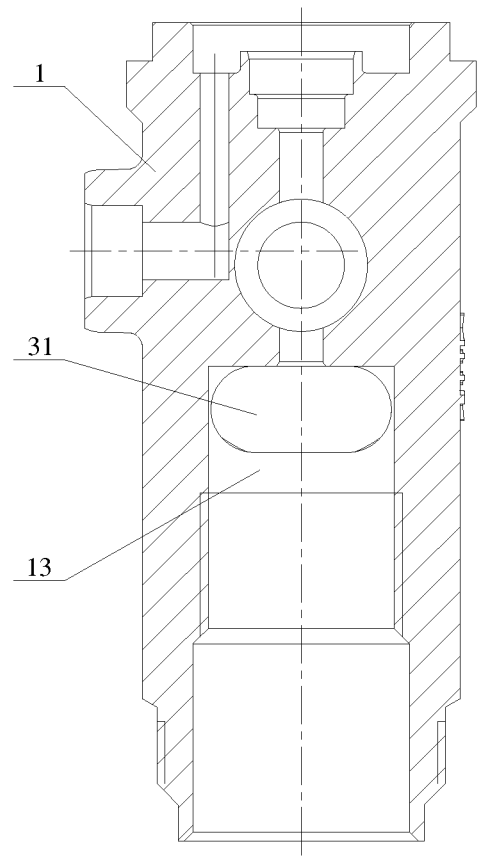
FIG. 14 is a sectional view of FIG. 13 taken along line A-A.

Furthermore, in order to reduce the radius of the connecting pipe 7, a cross section of the first communicating passage 31 may be designed as a substantially elliptical structure, which may be referred to FIG. 14 which is a sectional view of FIG. 13 taken along line A-A. With such arrangement, the axial width of the first communicating passage 31 may be reduced. For example, the cross section of the first communicating passage 31 may be designed as an elliptical structure or a substantially racetrack-shaped structure.

The first valve core 42 of the first valve core component 4 cooperates with the first valve port 14 to control the flow of fluid medium flowing from the inlet passage 11 to the outlet passage 12. In other words, when the pressure inside the temperature sensing component 2 increases, a transmission plate of the temperature sensing component 2 pushes the first valve core component 4 to move downwardly against the force of the spring 82, thus an opening between the first valve core 42 and the first valve port 14 is increased, which increases the flow of the fluid; on the contrary, when the pressure in the temperature sensing component 2 decreases, the first valve core component 4 is moved upwardly under a retuning force of the spring 82, thus the opening between the first valve core 42 and the first valve port 14 is decreased, which reduces the flow of the fluid.

An accommodating portion 16 extending inwards in a direction coaxial with an axis of the inlet passage 11 is formed in the valve body 1. In this embodiment, the accommodating portion 16 and the inlet passage 11 are arranged as a concentric stepped hole. A second valve port 15 is formed at a bottom of the stepped hole. The accommodating portion 16 is in communication with the outlet passage 12 via a second communicating passage 32. The outlet passage 12 and the second communicating passage 32 are arranged in parallel and are in communication with each other, thus the resistance on the fluid flowing from the outlet passage 12 into the second communicating passage 32 may be reduced.

A second valve core component 5 is further provided in the accommodating portion 16, and the valve rod 41 extends between the accommodating portion 16 and the inlet passage 11. Of course, in the present application, the accommodating portion 16 may also be a hole of an extension segment of the inlet passage 11 which has the same radius as the inlet passage 11; in other words, the accommodating portion and the inlet passage are actually two parts of one hole, and the second valve port 15 is provided at the bottom of this hole.

Figure 15:
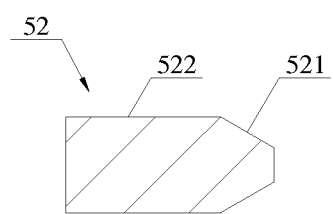
FIG. 15 is a schematic view showing the structure of a second valve core shown in FIG. 12.

As shown in the Figures, the second valve core component 5 includes a second valve core 52 arranged in the accommodating portion 16 and a limiting pin rod 55. The second valve core 52 includes a first segment 521 and a second segment 522. Referring to FIG. 15, the second segment 522 is a valve core body for cooperating with the limiting pin rod 55, and the first segment 521 has a conical structure for cooperating with the second valve port 15, and the limiting pin rod 55 is used to limit an opening operational position of the second valve core 52.

During the operation, when the medium flows from the inlet passage 11 to the outlet passage 12, the expansion valve functions to throttle, and under the pressure of the fluid, the second valve core 52 abuts against the second valve port 15, which closes the second valve port 15; and when the medium flows from the outlet passage 12 to the inlet passage 11, the second valve core 52 is moved away from the second valve port 15 under the pressure of the fluid, which opens the second valve port 15, and in this state, the second valve core 52 abuts against the limiting pin rod 55 and the expansion valve dose not work.

With the above design solution, under the premise of providing a one-way control function, the thermal expansion valve may significantly reduce the blocking effect on the communicating passage caused by the limiting structure, and has a compact structure and is convenient to produce; and the assembly of the second valve core component is simple and reliable, without additionally machining a hole, thereby reducing the risk of leakage.

In conjunction with FIGS. 12 and 13, the valve body 1 is provided with a guiding hole 191 in communication with the accommodating portion 16, thus the limiting pin rod 55 may be fixedly inserted in the guiding hole 191. It is understood that, the shapes of a cross section of the limiting pin rod 55 and a cross section of the guiding hole 191 for cooperating with the limiting pin rod 55 may be randomly selected, for example, the cross section may be circular or polygonal. Apparently, the circular cross section has the optimal manufacturability. In practice, an outer end of the guiding hole may have an enlarged hole segment (not shown), and an outer end of the limiting pin rod has a limiting portion for cooperating with the enlarged hole segment, thereby precisely controlling the position relationship between the limiting pin rod and the valve body.

It is well known that, the medium in the valve body 1 has a certain operating pressure, and the outer end of the limiting pin rod 55 and the guiding hole 191 are hermetically connected, or are sealed by partial tight fitting or by pressing an end cap. Preferably, the hermetical connection may be realized by coating anaerobic adhesive.

Additionally, a state that an inner end of the limiting pin rod 55 is lower than a center axis of the second valve core 52 is an optimal stress state. Preferably, the direction in which the limiting pin rod 55 is arranged is perpendicular to the direction of movement of the second valve core component 5, thus the limiting pin rod 55 and the second valve core component 5 may have a greater contacting area in the limiting state.

In order to control the impact on the flow area of the flow passage where the second valve core component 5 is located caused by the limiting pin rod 55 to the greatest extent, in a projective plane perpendicular to the direction of the movement of the second valve core component 5, a ratio of an area of the limiting pin rod 55 located in the accommodating portion 16 to an area of the accommodating portion 16 may be selected to be less than 0.2, thereby reducing the blocking effect on the flow passage while ensuring the impact strength. Additionally, a center axis of the second valve core component 5 is coaxial with a center axis of the inlet passage 11, which may also effectively control the flow resistance of the flow passage where the second valve core component 5 is located.

On this basis, an elastic component 53 may be arranged on the limiting pin rod 55 at a position where the limiting pin rod 55 cooperates with the second valve core component 5. With such arrangement, the impact generated by the pressure of fluid at the moment when the second valve core 52 is opened may be properly absorbed by the elastic component 53, thereby avoiding the noise in opening the second valve core 52, which is generated when the second valve core 52 directly abuts against the limiting pin rod 55.

Sixth Embodiment

Compared this embodiment with the fifth embodiment, these two embodiments have the same general construction and connecting relationship. The difference is that, in this solution, the inner end of the limiting pin rod 55 is provided with a further positioning function.

Figure 16:
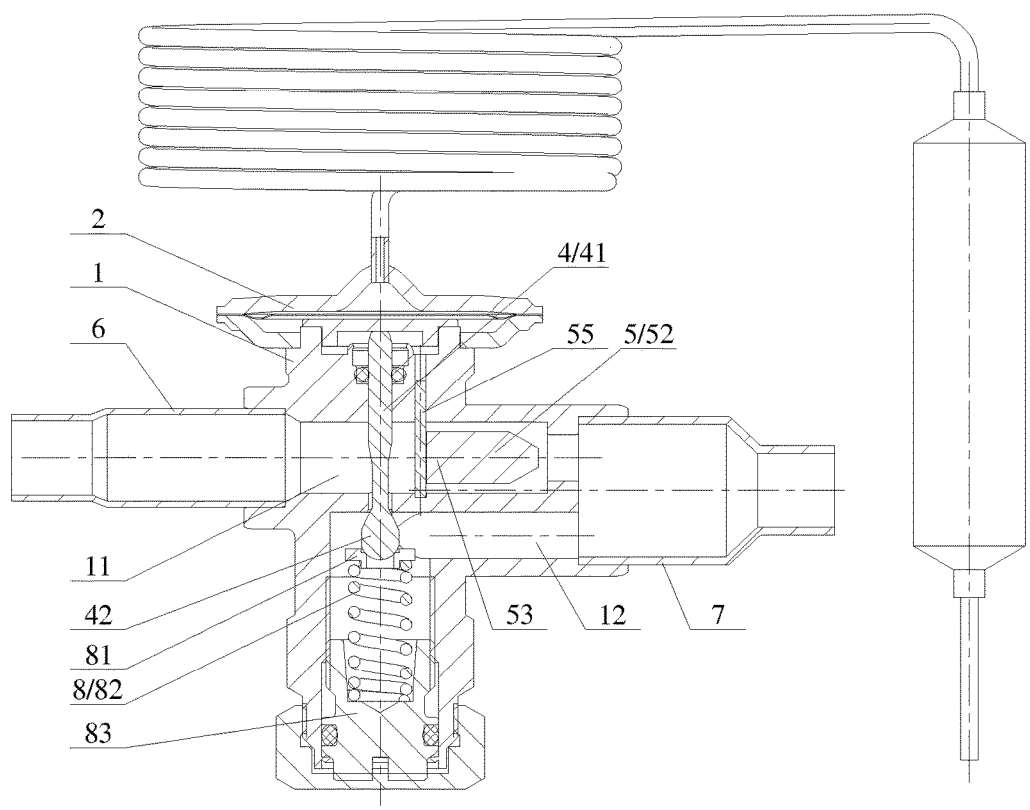
FIG. 16 is a schematic view showing the structure of a thermal expansion valve with one-way control function according to a sixth example of the embodiments.
Figure 17:
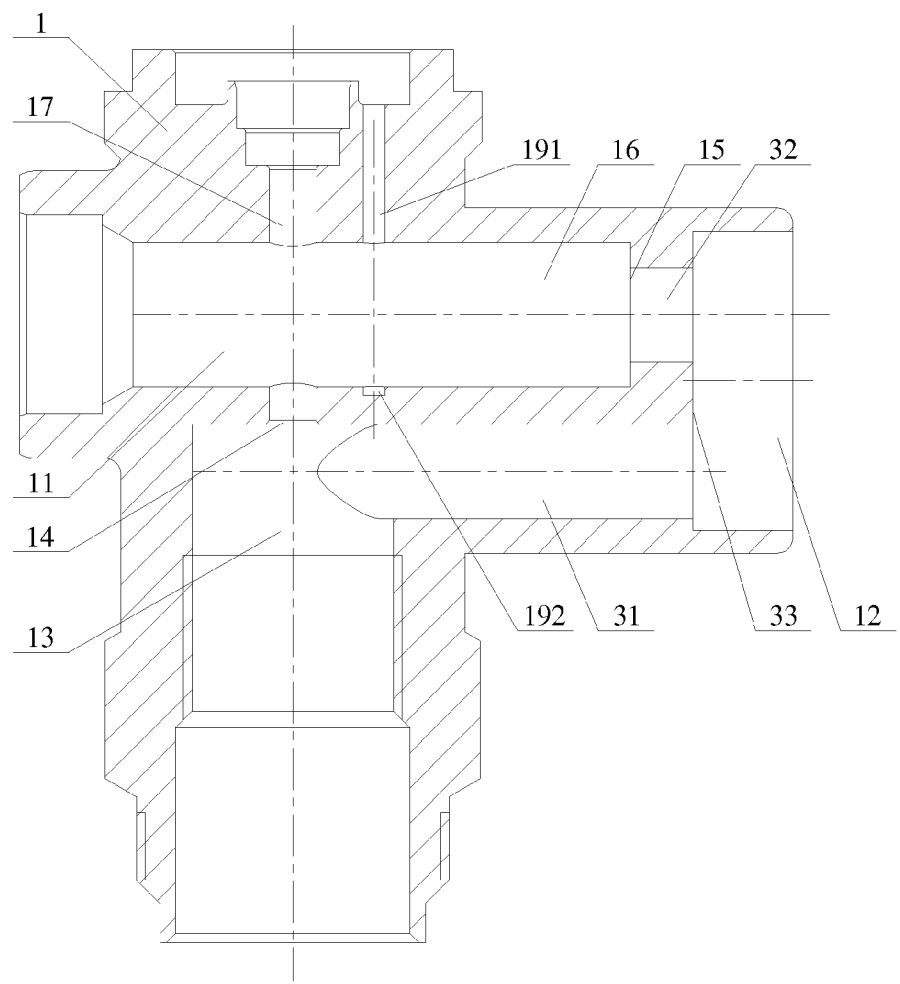
FIG. 17 is a schematic view showing the structure of a valve body of the thermal expansion valve shown in FIG. 16.

Reference is made to FIGS. 16 and 17. FIG. 16 is a schematic view showing the structure of a thermal expansion valve with one-way control function according to the sixth embodiment; and FIG. 17 is a schematic view showing the structure of a valve body of the thermal expansion valve shown in FIG. 16. In order to clearly show the difference and relationship between this solution and the fifth embodiment, the members and the structures with the same functions are indicated by the respective same reference numerals.

As shown in FIGS. 16 and 17, the wall at the other side of the accommodating portion 16, that is axially facing the guiding hole 191, is provided with a positioning blind hole 192, and the inner end of the limiting pin rod 55 is placed in the positioning blind hole 192. In this solution, the inner end of the limiting pin rod 55, which is protruding out, may be reliably positioned, which is different from the stress state of the cantilever beam type in the fifth embodiment, thereby further improving the operating stability.

It is to be noted that, in the Figures of this embodiment, the elastic component 53, arranged on the limiting pin rod 55 at a position where the limiting pin rod 55 cooperates with the second valve core component 5, is not shown, however, apparently, it may be achieved by the person skilled in the art according to practical requirements by referring to the fifth embodiment.

Seventh Embodiment

Figure 18:
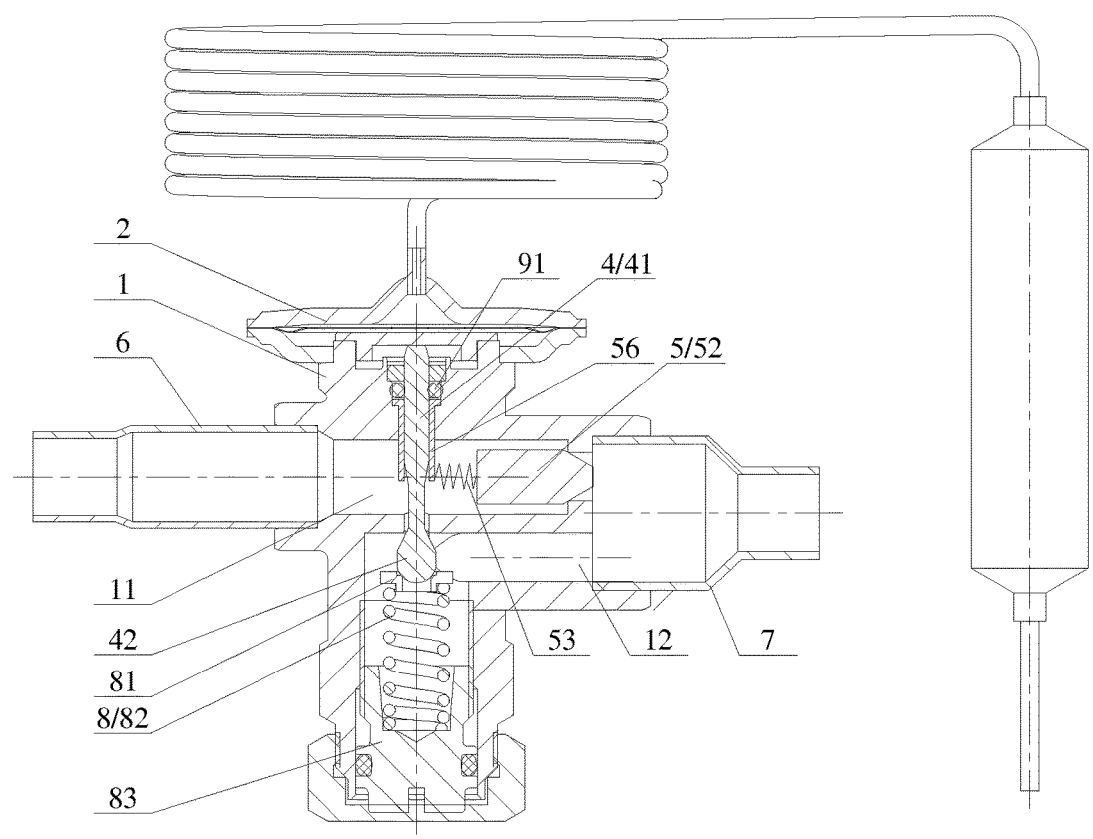
FIG. 18 is a schematic view showing the structure of a thermal expansion valve with one-way control function according to a seventh example of the embodiments.
Figure 19:
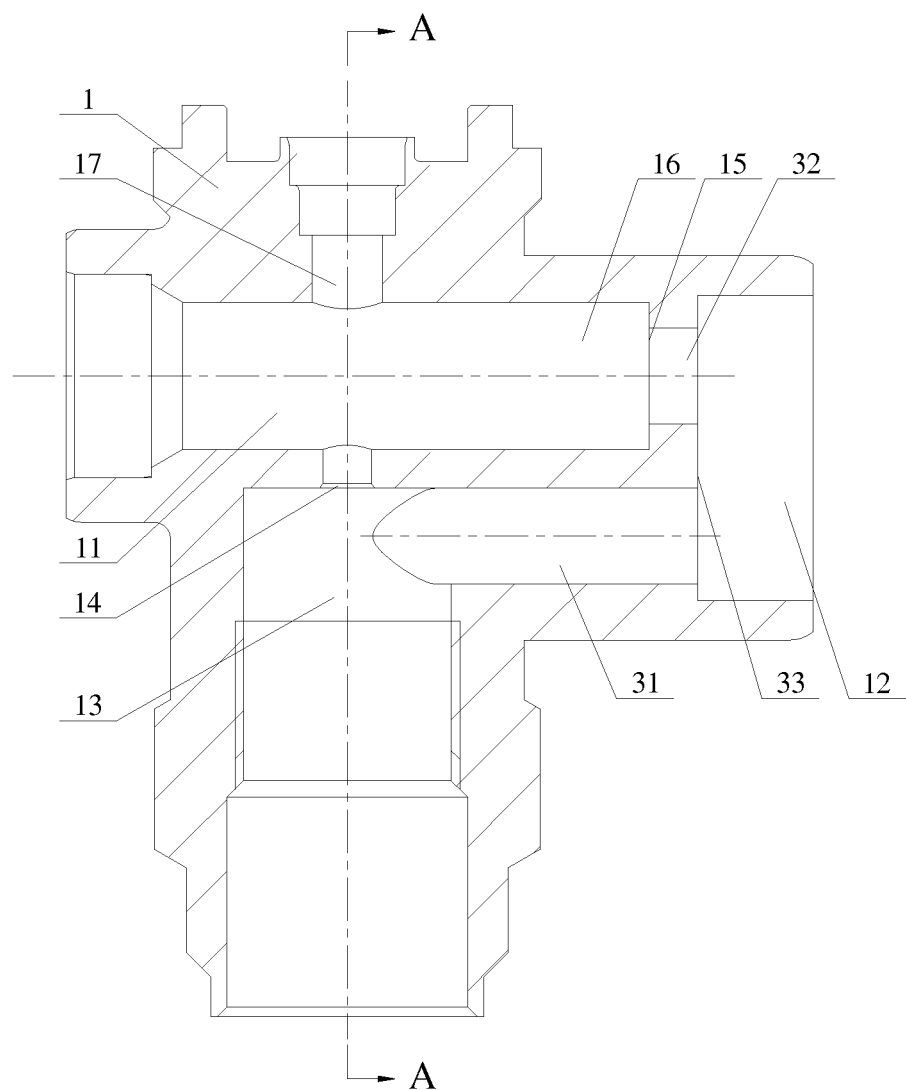
FIG. 19 is a schematic view showing the structure of a valve body of the thermal expansion valve shown in FIG. 18.

Reference is made to FIGS. 18 and 19. FIG. 18 is a schematic view showing the structure of a thermal expansion valve with one-way control function according to the seventh embodiment; and FIG. 19 is a schematic view showing the structure of a valve body of the thermal expansion valve shown in FIG. 18.

As shown in FIGS. 18 and 19, in this embodiment, the thermal expansion valve includes a valve body 1, and an inlet passage 11 and an outlet passage 12 are provided on the valve body 1. An inner cavity 13 in communication with the inner passage 11 and the outlet passage 12 is machined in the valve body 1. A temperature sensing component 12 is arranged at an end of the valve body 1. The inner cavity 13 of the valve body 1 further includes a vertical through hole 17 in communication with the temperature sensing component 2. A lower portion of the hole 17 intersects with the inner cavity 13 to form a first valve port 14.

A first valve core component 4 is provided in and extends through the through hole 17 in the inner cavity 13. The first valve core component 4 includes a valve rod 41 and a first valve core 42. The valve rod 41 abuts against the temperature sensing component 2. As shown in the Figures, in this embodiment, the valve rod 41 is integrally formed with the first valve core 42. Of course, the valve rod 41 and the first valve core 42 may also be separately produced and then combined together.

A valve seat assembly 8 is further arranged in the inner cavity 13 of the valve body 1, which includes a base 83 fixed on the valve body 1, and a valve supporting seat 81 abutting against the first valve core 42 via a spring 82. In this embodiment, a connecting pipe 6 allowing the fluid to flow in and a connecting pipe 7 allowing the fluid to flow out are hermetically welded on the valve body 1. The connecting pipe 6 is in communication with the inlet passage 11. The connecting pipe 7 directly protrudes into the outlet passage 12 and directly abuts against a bottom surface 33 of the outlet passage 12. The inner cavity 13 and the outlet passage 12 of the valve body 1 are communicated via a first communicating passage 31. Preferably, the outlet passage 12 and the first communicating passage 31 are arranged in parallel and are in communication with each other, thus the resistance on the fluid flowing from the first communicating passage 31 into the outlet passage 12 may be reduced.

Figure 20:
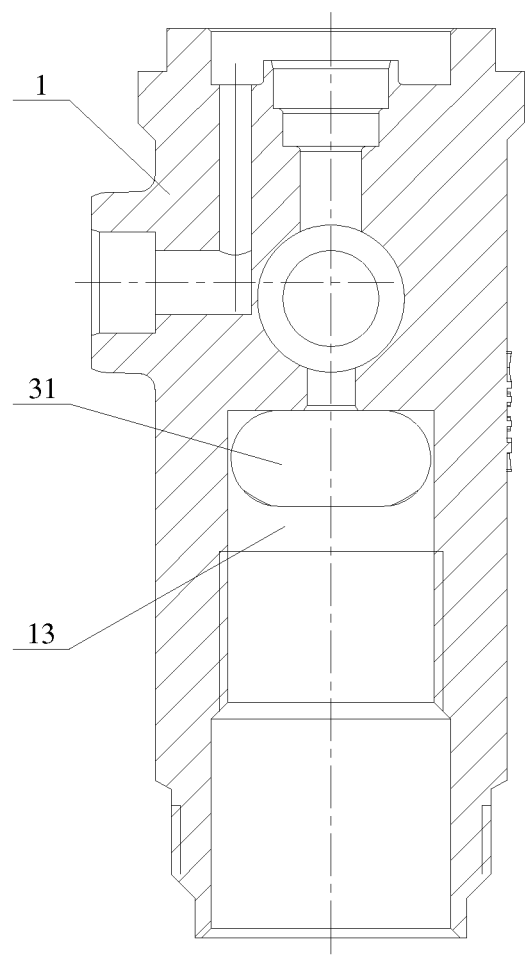
FIG. 20 is a sectional view of FIG. 19 taken along line A-A.

Furthermore, in order to reduce the radius of the connecting pipe 7, a cross section of the first communicating passage 31 may be designed as a substantially elliptical structure, which may be referred to FIG. 20 which is a sectional view of FIG. 19 taken along line A-A. With such arrangement, the axial width of the first communicating passage 31 may be reduced. For example, the cross section of the first communicating passage 31 may be designed as an elliptical structure or a substantially racetrack-shaped structure.

The first valve core 42 of the first valve core component 4 cooperates with the first valve port 14 to control the flow of fluid medium flowing from the inlet passage 11 to the outlet passage 12. In other words, when the pressure inside the temperature sensing component 2 increases, a transmission plate of the temperature sensing component 2 pushes the first valve core component 4 to move downwardly against the force of the spring 82, thus an opening between the first valve core 42 and the first valve port 14 is increased, which increases the flow of the fluid; on the contrary, when the pressure in the temperature sensing component 2 decreases, the first valve core component 4 is moved upwardly under a retuning force of the spring 82, thus the opening between the first valve core 42 and the first valve port 14 is decreased, which reduces the flow of the fluid.

An accommodating portion 16 extending inwards in a direction coaxial with an axis of the inlet passage 11 is formed in the valve body 1. In this embodiment, the accommodating portion 16 and the inlet passage 11 are arranged as a concentric stepped hole. A second valve port 15 is formed at a bottom of the stepped hole. The accommodating portion 16 is in communication with the outlet passage 12 via a second communicating passage 32. The outlet passage 12 and the second communicating passage 32 are arranged in parallel and are in communication with each other, thus the resistance on the fluid flowing from the outlet passage 12 into the second communicating passage 32 may be reduced.

A second valve core component 5 is further provided in the accommodating portion 16, and the valve rod 41 extends between the accommodating portion 16 and the inlet passage 11. Of course, in the present application, the accommodating portion 16 may also be a hole of an extension segment of the inlet passage 11 which has the same radius as the inlet passage 11; in other words, the accommodating portion and the inlet passage are actually two parts of one hole, and the second valve port 15 is provided at the bottom of this hole.

As shown in the Figures, the second valve core component 5 includes a second valve core 52 arranged in the accommodating portion 16 and a limiting sleeve 56. The second valve core 52 has the same structure as the second valve core in the fifth embodiment (which may be referred to FIG. 15). The second valve core 52 has a second segment 522 which is a valve core body for cooperating with the limiting sleeve 56, and a first segment 521 having a conical structure and used to cooperate with the second valve port 15. Similarly, the limiting sleeve 56 is mounted between the valve rod 41 and the valve body 1. The limiting sleeve 56 extends inwardly into the accommodating portion 16 to limit the opening operational position of the second valve core 52.

The state that an inner end of the limiting sleeve 56 is lower than a center axis of the second valve core 52 is an optimal state. Of course, a total length of a portion of the limiting sleeve 56 that protrudes into the accommodating portion 16 should be determined under the condition that the first valve core 42 may be guided by the limiting sleeve 56 and the flow capability of the expansion valve in operation may be ensured.

During the operation, when the medium flows from the inlet passage 11 to the outlet passage 12, the expansion valve functions to throttle, and under the pressure of the fluid, the second valve core 52 abuts against the second valve port 15, which closes the first valve port 14; and when the medium flows from the outlet passage 12 to the inlet passage 11, the second valve core 52 is moved away from the second valve port 15 under the pressure of the fluid, which opens the first valve port 14, and in this state, the second valve core 52 abuts against the limiting sleeve 56 and the expansion valve dose not work.

With the above design solution, under the premise of providing a one-way control function of the thermal expansion valve, it is not necessary to manufacture a separate mounting structure for the limiting sleeve 56. Thus, on the basis of effectively limiting the opening operational position of the second valve core component, the thermal expansion valve has a compact structure and is convenient to produce. Furthermore, the assembly of the second valve core component is simple and reliable, without additionally machining a hole, thereby reducing the risk of leakage.

In conjunction with FIGS. 18 and 19, the limiting sleeve 56 and the valve rod 41 are coaxially arranged in the hole 17, and an upper portion of the limiting sleeve 56 may be provided with a positioning step to axially position the limiting sleeve 56 with respect to the valve body 1. It can be appreciated that, the shapes of a cross section of the limiting sleeve 56 and a cross section of the hole 17 for cooperating with the limiting sleeve 56 may be randomly selected, for example, the cross section may be circular or polygonal. Apparently, the circular cross section has the optimal manufacturability.

In order to control the impact on the flow area of the flow passage where the second valve core component 5 is located caused by the limiting sleeve 56 to the greatest extent, in a projective plane perpendicular to the direction of the movement of the second valve core component 5, a ratio of an area of the limiting sleeve 56 located in the accommodating portion 16 to the area of the accommodating portion 16 may be selected to be less than 0.3, thereby reducing the blocking effect on the flow passage while ensuring the impact strength.

Additionally, a center axis of the second valve core component 5 is coaxial with a center axis of the inlet passage 11, which may also effectively control the flow resistance of the flow passage where the second valve core component 5 is located.

Preferably, the direction in which the limiting sleeve 56 is arranged is perpendicular to the direction of movement of the second valve core component 5, thus the limiting sleeve 56 and the second valve core component 5 may have a greater contacting area in the limiting state. On this basis, an elastic component 53 may be arranged on the limiting sleeve 56 at a position where the limiting sleeve 56 cooperates with the second valve core component 5. With such arrangement, the impact generated by the pressure of fluid at the moment when the second valve core 52 is opened may be properly absorbed by the elastic component 53, thereby avoiding the noise in opening the second valve core 52, which is generated when the second valve core 52 directly abuts against the limiting sleeve 56.

It is well known that, the medium in the valve body 1 has a certain operating pressure, thus a sealing fit should be provided between the limiting sleeve 56 and the hole 17 and between the limiting sleeve 56 and the valve rod 41. As shown in FIG. 18, a second sealing member 91 is arranged between a portion of the valve rod 41 protruding out of the limiting sleeve 56 and the valve body 1. In other words, the sealing between the limiting sleeve 56 and the hole 17, and the sealing between the limiting sleeve 56 and the valve rod 41 are both achieved by the second sealing member 91. Of course, the above two sealing positions may be provided with a respective sealing member.

Eighth Embodiment

Compared this embodiment with the seventh embodiment, these two embodiments have the same general construction and connecting relationship. The difference is that, in this solution, the inner end of the limiting sleeve 56 is provided with a further positioning function.

Figure 21:
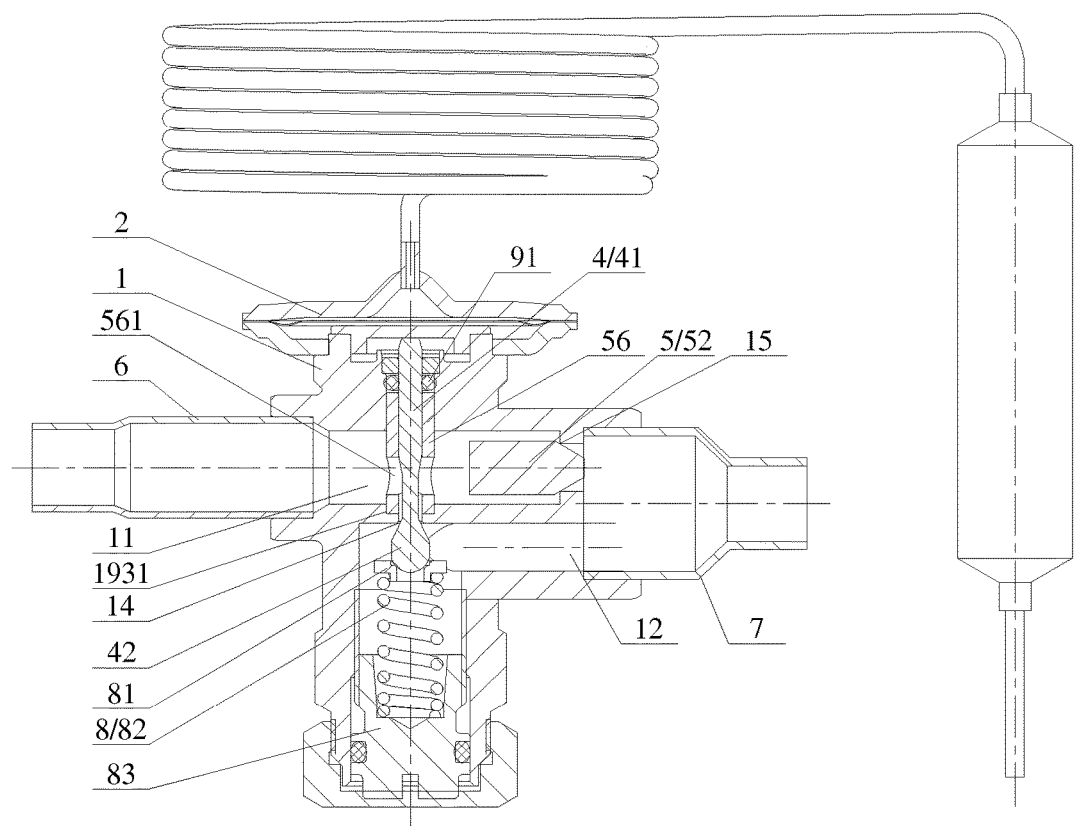
FIG. 21 is a schematic view showing the structure of a thermal expansion valve with one-way control function according to an eighth example of the embodiments.
Figure 22:
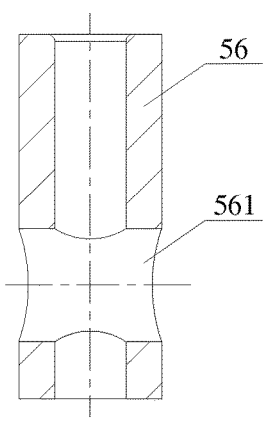
FIG. 22 is a schematic view showing the structure of a limiting sleeve of the thermal expansion valve shown in FIG. 21.

Reference is made to FIGS. 21 and 22. FIG. 21 is a schematic view showing the structure of a thermal expansion valve with one-way control function according to the eighth embodiment; and FIG. 22 is a schematic view showing the structure of a limiting sleeve of the thermal expansion valve shown in FIG. 21. In order to clearly show the difference and relationship between this solution and the seventh embodiment, the members and the structures with the same functions are indicated by the respective same reference numerals.

As shown in FIGS. 21 and 22, a positioning stopping port 1931 is provided in the valve body 1 above the first valve port 14, and is used to accommodate the inner end of the limiting sleeve 56, which is protruding out, and the limiting sleeve 56 is provided with a through hole 561 used to communicate the inlet passage 11 with the accommodating portion 16. In this solution, the inner end of the limiting sleeve 56, which is protruding out, may be reliably positioned, which is different from the stress state of the cantilever beam type in the first embodiment, thereby further improving the operating stability. Furthermore, the limiting sleeve 56 may be axially positioned with respect to the valve body 1 by the positioning stopping port 1931, thus it is not necessary to additionally provide a positioning step on the upper portion of the limiting sleeve 56.

The through hole 561 is mainly formed in a flow passage from the inlet passage 11 to the first valve port 14, thus, a center axis of the through hole 561 may be arranged to be lower than the center axis of the inlet passage 11, so as to reduce the flow resistance to a greatest extent.

It is to be noted that, in the Figures of this embodiment, the elastic component 53, arranged on the limiting sleeve 56 at a position where the limiting sleeve 56 cooperates with the second valve core component 5, is not shown, however, apparently, it may be achieved by the person skilled in the art according to practical requirements by referring to the first embodiment.

Ninth Embodiment

Compared this embodiment with the eighth embodiment, these two embodiments have the same general construction and connecting relationship. The difference is that, in this solution, the inner end of the limiting sleeve 56 has a different positioning structure.

Figure 23:
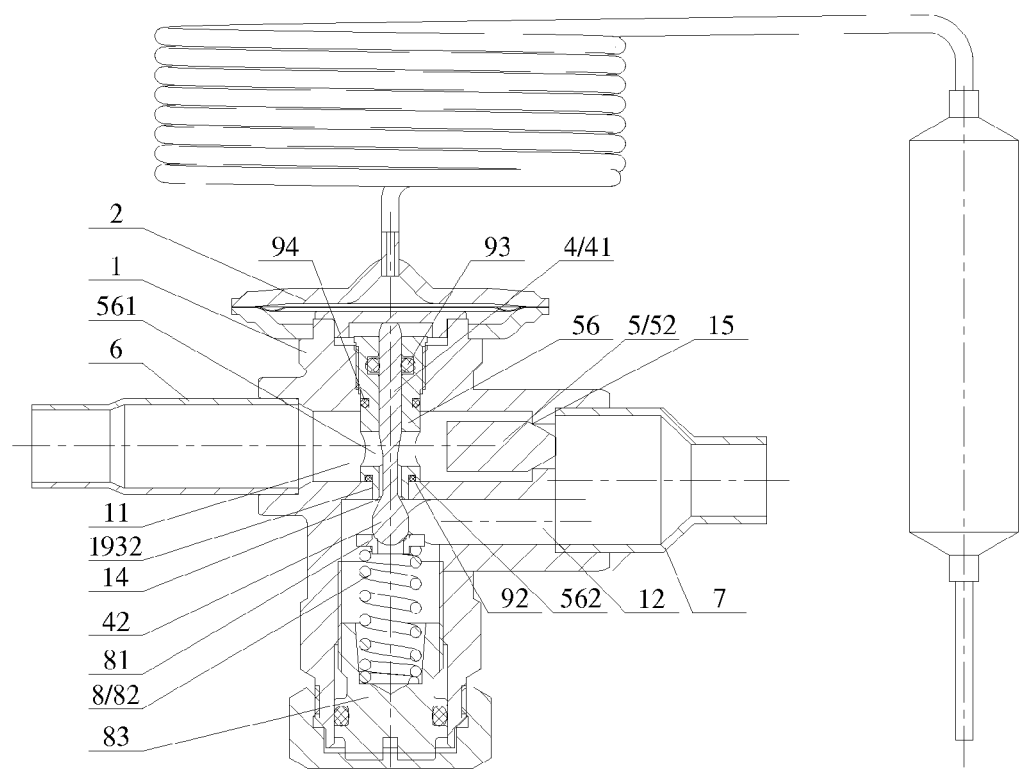
FIG. 23 is a schematic view showing the structure of a thermal expansion valve with one-way control function according to a ninth example of the embodiments.
Figure 24:
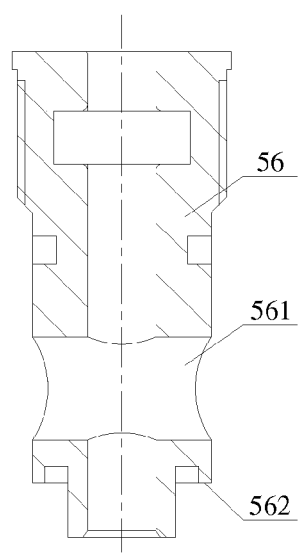
FIG. 24 is a schematic view showing the structure of a limiting sleeve of the thermal expansion valve shown in FIG. 23.

Reference is made to FIGS. 23 and 24. FIG. 23 is a schematic view showing the structure of a thermal expansion valve with one-way control function according to a ninth embodiment of the embodiments; and FIG. 24 is a schematic view showing the structure of a limiting sleeve of the thermal expansion valve shown in FIG. 23. In order to clearly show the difference and relationship between this solution and the seventh and eighth embodiments, the members and the structures with the same functions are indicated by the respective same reference numerals.

As shown in FIGS. 23 and 24, the valve body 1 is provided with an insertion-type mounting hole 1932 at a position corresponding to the first valve port 14, and the insertion-type mounting hole 1932 is used to accommodate an inner end of the limiting sleeve 56, which is protruding out, and the first valve port 14 is formed at the inner protruding end of the limiting sleeve 56. The limiting sleeve 56 is provided with a through hole 561 used to communicate the inlet passage 11 with the accommodating portion 16. In this case, the first valve core 42 is more reliably positioned, which may ensure the position relationship between the first valve core 42 and the first valve port 14, and guarantee the static superheat degree and the flow capability.

Another difference between this embodiment and the above embodiments is the manner of axially positioning the limiting sleeve 56 with respect to the valve body 1. In this embodiment, the limiting sleeve 56 has a positioning surface 562 abutting against the valve body 1 at the side of the insertion-type mounting hole 1932.

Correspondingly, a first sealing member 92 is arranged between the positioning surface 562 and the valve body 1. It should be understood that, the sealing between the positioning surface 562 and the valve body 1 may be achieved in other manners. For example, the sealing between the limiting sleeve 56 and the valve body 1 may be realized by a material inference fit. Any sealing manners are within the scope of the present application, as long as the functional requirements are met. Additionally, a third sealing member 93 is arranged between the limiting sleeve 56 and the valve rod 41, and a fourth sealing member 94 is arranged between the limiting sleeve 56 and the valve body 1. In other words, in this embodiment, the sealing between the limiting sleeve 56 and the hole 17, and the sealing between the limiting sleeve 56 and the valve rod 41 are achieved by providing a respective sealing member as mentioned in the seventh embodiment.

The embodiments described hereinabove are only preferred embodiments of the present application. It should be noted that, for the person skilled in the art, many modifications and improvements may be made to the present application without departing from the principle of the present application, and these modifications and improvements are also deemed to fall into the scope of the present application.

The invention claimed is:

1. A thermal expansion valve with one-way control function, comprising a valve body having an inlet passage and an outlet passage, a temperature sensing component placed at one end of the valve body, and a first valve core component placed in an inner cavity of the valve body, wherein the first valve core component comprises a valve rod abutting against the temperature sensing component, and a first valve core configured to cooperate with a first valve port in the inner cavity to control a flow of fluid medium flowing from the inlet passage to the outlet passage, and the valve body further comprises an accommodating portion extending inwardly to the valve body from the inlet passage, the accommodating portion is provided with a second valve port in communication with the inner cavity, a second valve core component is provided in the accommodating portion; and in a case that the medium flows from the inlet passage to the outlet passage, the second valve port is closed; and in a case that the medium flows from the outlet passage to the inlet passage, the second valve port is opened.

2. The thermal expansion valve according to claim 1, wherein the inlet passage coaxially extends into the valve body to form the accommodating portion, and the valve rod extends between the accommodating portion and the inlet passage.

3. The thermal expansion valve according to claim 1, wherein the accommodating portion is a hole extending inwardly to the valve body from the inlet passage and having a same diameter as the inlet passage, and the second valve port is provided at a bottom of the hole.

4. The thermal expansion valve according to claim 1, wherein the second valve core component comprises a supporting member, and a second valve core for cooperating with the second valve port.

5. The thermal expansion valve according to claim 4, wherein the accommodating portion and the inlet passage are arranged to form a stepped hole, and the second valve port is provided at a bottom of the stepped hole.

6. The thermal expansion valve according to claim 5, wherein the supporting member abuts against a stepped surface of the stepped hole.

7. The thermal expansion valve according to claim 3, wherein the supporting member is fixed by a snap ring.

8. The thermal expansion valve according to claim 3, wherein the supporting member is provided with an elastic retaining portion, and the supporting member is retained in the accommodating portion via the elastic retaining portion.

9. The thermal expansion valve according to claim 3, wherein the second valve core is spherical and abuts against the supporting member via a spring.

10. The thermal expansion valve according to claim 3, wherein the second valve core comprises a first segment and a second segment, the first segment has an approximately tapered structure, and the second segment has a cylindrical structure for cooperating with a supporting member.

11. The thermal expansion valve according to claim 1, wherein a communicating hole in communication with the second valve port is provided in the inner cavity at a side adjacent to the outlet passage, and the communicating hole forms an angle with respect to an axis of the outlet passage.

12. The thermal expansion valve according to claim 1, wherein the accommodating portion is in communication with the outlet passage via a second communicating passage, the outlet passage and a first communicating passage are arranged in parallel and are in communication with each other, and the outlet passage and the second communicating passage are arranged in parallel and are in communication with each other.

13. The thermal expansion valve according to claim 12, further comprising a connecting pipe welded on the valve body and allowing fluid to flow out, wherein the connecting pipe is in communication with the outlet passage.

14. The thermal expansion valve according to claim 13, wherein a highest surface of an inner hole of the connecting pipe is not lower than a lowest surface of an inner hole of the second communicating passage.

15. The thermal expansion valve according to claim 12, further comprising a connecting pipe welded on the valve body and allowing fluid to flow out, wherein the connecting pipe extends to a bottom end of the outlet passage.

16. The thermal expansion valve according to claim 14, wherein a cross section of the first communicating passage has an approximately elliptical structure.

17. The thermal expansion valve according to claim 1, wherein a limiting pin rod for limiting an opening operational position of the second valve core component is further provided in the accommodating portion.

18. The thermal expansion valve according to claim 17, wherein the valve body is provided with a guiding hole in communication with the accommodating portion, and the limiting pin rod is fixedly inserted in the guiding hole.

19. The thermal expansion valve according to claim 18, wherein a positioning blind hole is provided at another side wall of the accommodating portion that is axially facing the guiding hole, and an inner end of the limiting pin rod is placed in the positioning blind hole.

20. The thermal expansion valve according to claim 17, wherein in a projective plane perpendicular to a direction of movement of the second valve core component, a ratio of an area of a portion of the limiting pin rod located in the accommodating portion to an area of the accommodating portion is less than 0.2.

21. The thermal expansion valve according to claim 20, wherein an elastic component is provided on the limiting pin rod at a position where the limiting pin rod cooperates with the second valve core component.

22. The thermal expansion valve according to claim 20, wherein the limiting pin rod is arranged in a direction perpendicular to the direction of movement of the second valve core component.

23. The thermal expansion valve according to claim 21, wherein the limiting pin rod is arranged in a direction perpendicular to the direction of movement of the second valve core component.

24. The thermal expansion valve according to claim 1, wherein a limiting sleeve is arranged between the valve rod and the valve body, and the limiting sleeve extends inwardly into the accommodating portion to limit an opening operational position of the second valve core component.

25. The thermal expansion valve according to claim 24, wherein a positioning stopping port is provided in the valve body above the first valve port, and is configured to accommodate an inner end of the limiting sleeve, which is protruding out, and the limiting sleeve is provided with a through hole configured to communicate the inlet passage with the accommodating portion.

26. The thermal expansion valve according to claim 24, wherein the valve body is provided with an insertion-type mounting hole at a position corresponding to the first valve port, and the insertion-type mounting hole is configured to accommodate an inner end of the limiting sleeve, which is protruding out, and the first valve port is formed at the inner protruding end of the limiting sleeve, and the limiting sleeve is provided with a through hole configured to communicate the inlet passage with the accommodating portion.

27. The thermal expansion valve according to claim 26, wherein the limiting sleeve has a positioning surface abutting against the valve body at one side of the insertion-type mounting hole, and a first sealing member is arranged between the positioning surface and the valve body.

28. The thermal expansion valve according to claim 25, wherein a center axis of the through hole is located below a center axis of the inlet passage.

29. The thermal expansion valve according to claim 24, wherein a second sealing member is arranged between a portion of the valve rod that protrudes out of the limiting sleeve and the valve body.

30. The thermal expansion valve according to claim 24, wherein a third sealing member is arranged between the limiting sleeve and the valve rod, and a fourth sealing member is arranged between the limiting sleeve and the valve body.

31. The thermal expansion valve according to claim 30, wherein an elastic component is provided on the limiting sleeve at a position where the limiting sleeve cooperates with the second valve core component.

* * * * *